June 5, 1928.
F. ST. JOHN
BRAKE
Filed Dec. 17, 1926
1,672,546
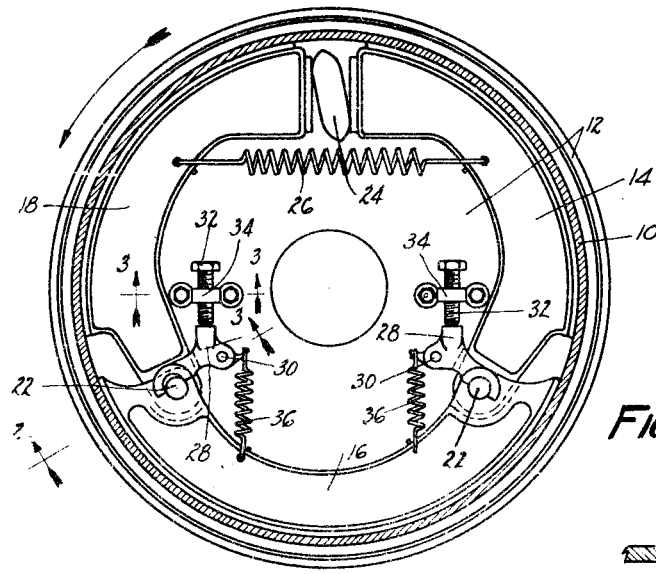
FIG.1
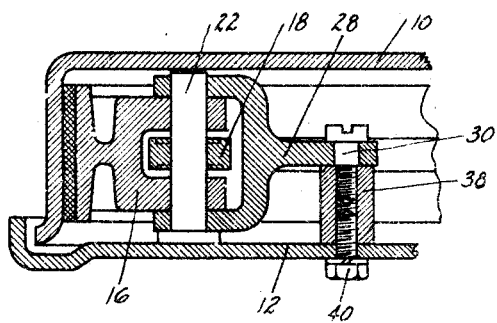
FIG.3
FIG.2
INVENTOR
FRANK ST JOHN
BY
ATTORNEY Patented June 5, 1928.

1,672,546

UNITED STATES PATENT OFFICE.

FRANK ST. JOHN, OF SOUTH BEND, INDIANA, ASSIGNOR TO BENDIX BRAKE COMPANY, OF CHICAGO, ILLINOIS, A CORPORATION OF ILLINOIS.

BRAKE.

Application filed December 17, 1926. Serial No. 155,367.

This invention relates to brakes and is illustrated as embodied in an internal expanding brake for an automobile. An object of the invention is to provide novel anchoring means for the brake shoes, or equivalent retarding means, preferably in such a manner as to provide for adjustment. In one desirable embodiment the anchoring means includes one or more levers, shown in the drawing as fulcrumed at the inner end, which engage the retarding means and which are swung by the retarding means when the brake is applied against suitable stops which may be in the form of adjustable set screws engaging the levers between their ends. I prefer to embody my novel anchoring means in a brake having at least three shoes with two of the above-described levers arranged at opposite ends of the intermediate shoe so that one of them is effective when the drum is turning in one direction and the other is effective when the drum is turning in the other direction. By this arrangement the intermediate shoe is applied in either direction of drum rotation by servo action through a connection from one of the end shoes. The particular form of anchoring lever and stop shown in the drawing also embodies in its particular construction substantial novelty.

The above and other objects and features of the invention, including various novel and desirable structural details, will be apparent from the following description of one illustrative embodiment shown in the accompanying drawing, in which:

Figure 1 is a vertical section through the brake just inside the head of the brake drum showing the brake shoes in side elevation;

Figure 2 is a partial radial section on the line 2—2 of Figure 1, showing the mounting of the above-described lever; and Figure 3 is a partial radial section on the line 3—3 of Figure 1 showing the mounting preferred for the adjustable set screw or stop.

The illustrated brake includes a suitable drum 10 rotating with the wheel (not shown) and which may be closed at its open side by a backing or dust plate 12. The friction means of the brake preferably includes three shoes 14, 16, and 18, the end shoes 14 and 18 being connected to opposite ends of the intermediate shoe 16 by floating pivots 22 having enlarged heads slidably engaging the backing plate 12. The brake is applied by means such as a double cam 24 against the resistance of a return spring 26.

The present invention relates to the anchoring means for the shoes or their equivalents. In the embodiment illustrated there are two levers 28 facing in opposite directions at the opposite ends of the intermediate shoe 16 and forked to form arms straddling opposite ends of the shoe 16 and having semi-circular sockets to embrace the ends of the floating pivots 22. The two levers 28 extend radially of the drum and are fulcrumed on pivots 30 carried by the backing plate 12 and arranged at the inner ends of the lever, and they are also formed with offset thrust surfaces engaging adjustable set screws or equivalent stops 32 which may be threaded through brackets 34 secured to the backing plate 12. The levers 28 are urged against the stops 32, and the shoe 16 is urged at its opposite ends away from the drum 10, by coil tension springs 36 connected at their opposite ends to the shoe 16 and to fingers projecting inwardly of the fulcrums 30 of levers 28.

As shown in Figure 2, each of the levers 28 may have its fulcrum pin 30 threaded into a sleeve 38 secured to the backing plate 12 by a cap screw 40.

In the operation of the above-described brake, if the drum is turning in a counter-clockwise direction, as illustrated in Figure 1, the left-hand lever 28 is held against its stop 32 by its spring 36, so that the left-hand pin 22 moves a short distance from the sockets in the arms at the ends of its lever 28, and the torque of all three of the shoes is transmitted through the right-hand pin 22 and the right-hand lever 28 to the right-hand stop 32. If the drum is turning in a clockwise direction, the operation is reversed, and the torque of all three of the shoes is taken on the left-hand stop 32 through the left-hand lever 28. It will be observed that the levers 28 and the stops 32 and the brackets 34 and the pins 22 on the right and left sides of the brake are interchangeable and that the shoes 14 and 18 are interchangeable.

While one illustrative embodiment of the invention has been described in detail, it is not my intention to limit its scope to that particular embodiment or otherwise than by the terms of the appended claims.

I claim:

1. A brake comprising, in combination, a drum, an intermediate shoe and end shoes engageable with the drum, means pivotally connecting the shoes, a lever arranged at each end of the intermediate shoe, and stops for the levers arranged to take the braking torque of the shoes.

2. A brake comprising, in combination, a drum, an intermediate shoe and end shoes engageable with the drum, a lever arranged at each end of the intermediate shoe, and stops for the levers arranged to take the braking torque of the shoes.

3. A brake comprising, in combination, a drum, a friction device engageable with the drum, a pair of levers arranged to be rocked by the friction device, and adjustable stops engaged by said levers and one or the other of which stops takes the braking torque of the friction device.

4. A brake comprising, in combination, a drum, a friction device engageable with the drum, a pair of radial levers fulcrumed at their inner ends and arranged to be rocked by the friction device, and adjustable stops engaged by intermediate parts of said levers and one or the other of which stops takes the braking torque of the friction device.

5. A brake comprising, in combination, a drum, a retarding device engageable with the drum, a radial lever connected to the retarding device at its outer end and fulcrumed at its inner end, and a stop engaged by the lever to take the torque of the retarding device.

6. A brake comprising, in combination, a drum, a retarding device engageable with the drum, a lever connected to the retarding device, and a stop engaged by the lever to take the torque of the retarding device.

7. A brake comprising, in combination, a drum, a retarding device engageable with the drum, a radial lever connected to the retarding device at its outer end and fulcrumed at its inner end, and a stop engaged by the lever to take the torque of the retarding device when the drum is turning in one direction, together with means separate from said lever for taking the torque of the retarding device when the drum is turning in the opposite direction.

8. A brake comprising, in combination, a drum, a retarding device engageable with the drum, a lever connected to the retarding device, and a stop engaged by the lever to take the torque of the retarding device when the drum is turning in one direction, together with means separate from said lever for taking the torque of the retarding device when the drum is turning in the opposite direction.

9. A brake comprising, in combination, at least three shoes arranged end to end and connected by pivots, oppositely facing pivoted levers pivotally engaging said pivots, and stops engaged by the levers to take the braking torque of the shoes.

10. A brake comprising, in combination, at least three shoes arranged end to end and connected by pivots, and means including oppositely facing pivoted levers pivotally engaging said pivots and arranged to take the braking torque of the shoes.

11. A brake comprising, in combination, at least three shoes arranged end to end and connected by pivots, oppositely facing pivoted levers pivotally engaging said pivots, and adjustable stops engaged by the levers to take the braking torque of the shoes.

12. A brake comprising, in combination, at least three shoes arranged end to end and connected by pivots, oppositely facing pivoted levers pivotally engaging said pivots, and adjustable set screws engaged by the levers to take the braking torque of the shoes.

In testimony whereof, I have hereunto signed my name.

FRANK ST. JOHN.